United States Patent [19]

Knopp

[11] 4,029,476
[45] June 14, 1977

[54] BRAZING ALLOY COMPOSITIONS
[75] Inventor: Walter V. Knopp, Wyckoff, N.J.
[73] Assignee: A. Johnson & Co. Inc., New York, N.Y.
[22] Filed: Feb. 12, 1976
[21] Appl. No.: 657,691
[52] U.S. Cl. .............................. 428/676; 75/134 N; 75/208 R; 75/251; 428/679
[51] Int. Cl.² .................... B22F 3/00; C22E 33/00
[58] Field of Search ................. 29/182.2, 194, 196, 29/196.1, 504, 192; 75/134 N, 208 R

[56] References Cited
UNITED STATES PATENTS
3,717,442  2/1973  Knopp ............................ 29/182.2

OTHER PUBLICATIONS
Jones, W. D. *Fundamental Principles of Powder Metallurgy* Ed. Arnold, London, 1960, pp. 508–509.

Primary Examiner—Richard E. Schafer
Attorney, Agent, or Firm—Hopgood, Calimafde, Kalil, Blaustein and Lieberman

[57] ABSTRACT

A brazing alloy is provided consisting essentially by weight of about 30 to 50% copper, about 10 to 20% manganese, about 3 to 25% iron, about 0.5 to 4% silicon, about 0.5 to 2% boron and the balance essentially nickel.

13 Claims, 3 Drawing Figures

BRAZING ALLOY COMPOSITIONS

This invention relates to the brazing of one metal substrate to another and, in particular, relates to a brazing alloy comprising in its preferred aspects a metal composition.

This invention is an improvement over U.S. Pat. No. 3,717,442, which issued to the same inventor and which is assigned to the same assignee.

STATE OF THE ART

In the brazing of metal parts together, e.g. steel parts, it is essential for effective results that the brazing metal or alloy flow smoothly at the brazing temperature and wet the metal surfaces to be brazed together so as to provide a smooth radial fillet of adequate strength at the joint, a brazing flux being generally used.

In the powder metallurgy art, it is not uncommon to braze and sinter compacted metal parts together in one operation, or braze a compacted metal part to a wrought metal part while simultaneously sintering the powder metal part.

However, as stated in U.S. Pat. No. 3,717,442, a problem in brazing a pressed powder metal part to a metal substrate, be it a powder metal substrate or a wrought metal substrate, is that, because the pressed powder metal part is porous, precautions must be taken to avoid substantial infiltration of the bulk of the brazing alloy into the porous substrate, otherwise the joint is robbed of the benefits of the brazing material.

A still further problem is that in instances where substantial infiltration of the brazing alloy into the porous substrate results, erosion of the powder metal part is apt to occur so as to affect adversely the precision and appearance of the parts being brazed, as well as the physical properties thereof.

The foregoing is particularly a problem with respect to the combined sintering and brazing of pressed metal parts of steel, such as carbon steel.

Powder metal steel parts are generally produced by mixing carbon (e.g. 1% by weight of graphite) with iron powder and a lubricant (e.g. ¾% by weight of zinc stearate) and the desired shape produced by pressing the powder in a mold at pressures of at least 20 tsi (tons per square inch), for example from 20 tsi to 60 tsi, or higher, to produce a green compact ranging in density of generally over 5.5 grams/c.c. to as high as 7 or higher. Generally, the green density may range from 5.7 to 7 grams/c.c.

In U.S. Pat. No. 3,717,442, a brazing alloy found to provide improved results comprises about 30 to 50% copper, about 10 to 20% manganese, about 0.5 to 3% silicon, about 0.5 to 1.5% boron and the balance essentially nickel in the range of about 30 to 50%. It was noted that with this brazing alloy, the braze material infiltrates only to a limited extent so that a major portion of the braze remains at the joint and provides a smooth fillet at the interface between the brazed parts.

While the foregoing alloy was a marked step forward for the brazing of porous steel parts, it was noted that there was a tendency for the braze alloy, depending upon the temperature of brazing, to dissolve some of the iron from the substrate at the interface of the joint. This tended to degrade the joint which required controlling the brazing temperature in order to inhibit iron dissolution.

In addition, the foregoing alloy in the form of a brazing powder did not have the desired green strength when pressed into a brazing preform for use in forming a brazed joint.

Thus, it would be desirable to provide a brazing alloy which not only avoids excessive infiltration but which at the same time provides a joint of good integrity between two powder metal steel parts or between a powder metal steel part and a solid metal substrate, such as wrought steel, cast iron and the like. It would also be desirable to provide a powder brazing composition characterized by good green strength when pressed into a brazing preform.

It has now been discovered that the brazing alloy described hereinabove can be further improved by incorporating therein an effective amount of iron.

OBJECTS OF THE INVENTION

It is thus an object of the invention to provide a brazing alloy composition such as metallic brazing powder for use in brazing metal parts together, especially metal parts in which at least one part is a porous powder metallurgy steel part.

Another object is to provide a brazed joint of improved integrity.

The invention will more clearly appear when taken in conjunction with the following disclosure, claims and the accompanying drawing wherein:

STATEMENT OF THE INVENTION

Figure 1:
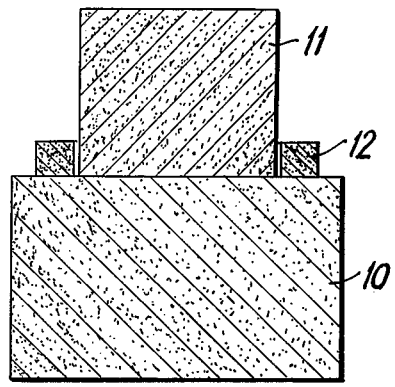
FIG. 1 is a cross section of two powder metallurgy steel parts assembled together for brazing.

The brazing alloy composition provided by the invention comprises by weight about 30 to 50% copper, about 10 to 20% manganese, about 3 to 25% iron, about 0.5 to 3% or 4% silicon, about 0.5 to 1.5% or 2% boron and the balance essentially nickel, such as in the range of about 30 to 50%.

The brazing alloy composition is preferably used in powder form as a mixture of an alloy powder of Cu-Mn-Ni-Si-B blended with iron powder such as to provide an alloy composition corresponding to the aforementioned composition range.

For example, the Cu-Mn-Ni-Si-B alloy in powder form may preferably be in the atomized condition such that when the metallic iron powder is blended with it, the average composition of the powder blend consists essentially by weight of about 30 to 50% Cu, about 10 to 20% Mn, about 0.5 to 4% Si, about 0.5 to 2% B, about 3 to 25% Fe and the balance essentially Ni, e.g. about 30 to 50%.

A preferred average composition of the blend of alloy powder and iron powder consists essentially by weight of about 30 to 50% Cu (e.g. 35 to 45%), about 10 to 20% Mn, about 0.5 to 3% Si, about 0.5 to 1.5% B, about 5 to 20% Fe, and the balance essentially nickel (e.g. in the range of about 36 to 48%), the sum of Si and B being about 1.7 to 4%. A particularly preferred iron content is about 5 to 15%.

A more preferred brazing composition is one containing about 38 to 42% Cu, about 39 to 43% Ni, about 14 to 17% Mn, about 8 to 12% Fe, about 1.6 to 2% Si and about 1 to 1.4% B.

A brazed joint produced from the foregoing average composition either as a powder blend or some other form will generally have a deposited braze composition assaying substantially over the foregoing ranges.

An advantage of the novel brazing composition is that it can be employed in combination with the sintering of a green compact of a steel composition, the sintering temperature, lying within the desirable brazing temperature range, while avoiding substantial infiltration of the alloy into the part and inhibiting dissolution of iron at the interface of said part. The sintering and brazing operations are carried out under substantially non-oxidizing conditions, for example, in a reducing atmosphere, such as hydrogen, cracked ammonia, wet Endogas, and the like. Wet Endogas is a partially combusted hydrocarbon gas which may contain about 20% CO, 40% $H_2$ and the balance essentially $N_2$, the gas having a dew point of about + 50° F (10° C). Dry Endogas may also be used.

The brazing material may be employed as a powder at the area to be joined or the powder may be pressed into a desired preform conforming to the particular area being brazed or as a paste. Thus, where a cylindrical part is to be brazed to a metal substrate upon which it is placed, an annular preform ring may be pressed from the alloy powder to fit over the cylindrical part and onto the contacting substrate. This is illustrated by FIG. 1 which shows a powder metallurgy (P/M) pressed steel part 11 around which is a brazing ring 12 of the blended powder falling within the aforementioned composition range of the invention.

Figure 2:
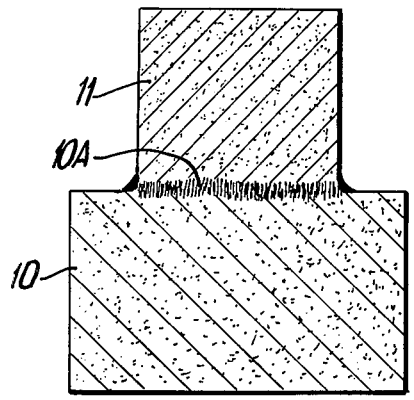
FIG. 2 is a cross section of the same two parts of FIG. 1 after the brazing operation.
Figure 3:
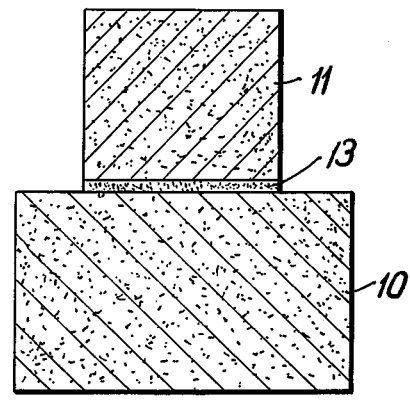
FIG. 3 depicts another assembly for brazing.

As shown in FIG. 1, the parts are ready for sintering as well as brazing. Following sintering and brazing at about 2050° F in a furnace having an atmosphere of dissociated ammonia, the sintered parts are shown in FIG. 2 in which a P/M steel part 11 has been brazed to another P/M steel part 10 by virtue of the brazed joint 10A which is achieved by the braze melting and flowing along the interface and forming a smooth fillet. The braze material infiltrates the porous substrates only to a limited extent sufficient to provide the necessary diffusion bond while assuring a brazed joint having the required fillet at the interface between the two parts, while substantially inhibiting dissolution of iron at the interface. Where the area at the interface is quite large, a pressed disc 13 or powder or paste of the braze material is placed between the parts to be brazed as shown in FIG. 3.

While a single alloy powder may be employed, it may be preferred to use a powder blend of the Cu-Mn-Ni-Si-B alloy and iron powder as stated hereinabove.

As previously stated, the advantage of blending iron with the Cu-Mn-Ni-Si-B alloy powder is that it improves the green strength when the blended powder is cold pressed into a brazing preform, such as the brazing ring 12 shown in FIG. 1 before the melting thereof to produce the strong joint 10A shown in FIG. 2.

While various iron powders may be employed for use in producing a brazing powder having the composition described herein, I have found electrolytic iron powder and carbonyl iron powder particularly preferred in producing a brazing element of optimum green strength. Other forms of iron powder are reduced iron oxide, sponge iron, atomized iron powder, and the like.

As illustrative of the improvement in green strength obtainable with the use of either carbonyl iron or electrolytic iron powder, the following example is given:

EXAMPLE 1

A braze alloy of Cu-Mn-Ni-Si-B in powder form (minus 40 mesh U.S. Standard Screen) consisting essentially by weight of about 40% Cu, 16% Mn, 41% Ni, 1.8% Si and 1.2% B is blended 100 parts by weight of alloy with 5, 10 and 20 parts by weight of carbonyl iron and electrolytic iron of minus 100 mesh size. Compacted brazing preforms were produced at compacting pressures of about 30 tsi (tons/in$^2$) and 40 tsi, respectively. The final blended compositions were:
1. 38.1% Cu, 15.2% Mn, 39.1% Ni 4.8% Fe, 1.7% Si and 1.1% B
2. 36.4Cu, 14.5% Mn, 37.3% Ni 9.1% Fe, 1.6% Si and 1.1% B
3. 33.3% Cu, 13.3% Mn, 34.2% Ni, 16.7% Fe, 1.5% Si and 1.0% B The results obtained are as follows:

| Compacting Pressure (tsi) | % Fe | Type Fe | Green Strength (Lbs./in.$^2$) |
|---|---|---|---|
| 30 | 0 | — | 490 |
| 30 | 4.8 | Carbonyl | 520 |
| 30 | 9.1 | Carbonyl | 560 |
| 30 | 16.7 | Carbonyl | 730 |
| 30 | 48 | Electrolytic | 640 |
| 30 | 9.1 | Electrolytic | 680 |
| 30 | 16.7 | Electrolytic | 710 |
| 40 | 0 | — | 760 |
| 40 | 4.8 | Carbonyl | 840 |
| 40 | 9.1 | Carbonyl | 900 |
| 40 | 16.7 | Carbonyl | 1200 |
| 40 | 4.8 | Electrolytic | 830 |
| 40 | 9.1 | Electrolytic | 960 |
| 40 | 16.7 | Electrolytic | 1030 |

With higher green strength, pressed braze preforms are easier to handle and breakage is minimized.

As stated hereinbefore, the amount of iron employed ranges from about 3 to 25% by weight of the composition. This range is preferred, and particularly about 5 to 20%, for the reason that it enables the use of brazing temperatures over the range of about 1850° F (1010° C) to 2100° F (1150° C), depending upon the amount of iron employed in forming strong joints with minimum iron dissolution at the interface of the substrates being joined, the brazing temperature varying substantially directly with the amount of iron added. That is, the higher the iron content, the higher the brazing temperature.

Another advantage of having iron present in the braze composition is that it enables braze joints to be produced in an atmosphere of wet Endogas. Some brazing alloys must avoid wet gas.

A braze alloy in the cast form containing 10, 20 and 30% iron, respectfully, was employed as a braze preform in the brazing of a green P/M steel part to a steel P/M substrate at a temperature of 2050° F (1120° C) to ½ hour in an atmosphere of wet Endogas, the cast alloys having the following compositions:

|  | (3) | (4) | (5) |
|---|---|---|---|
| % Cu | 36. | 32. | 28. |
| % Mn | 14.4 | 12.6 | 11.2 |
| % Ni | 36.9 | 33. | 28.7 |
| % Fe | 10.0 | 20. | 30. |
| % Si | 1.65 | 1.45 | 1.26 |
| % B | 1.05 | 0.95 | 0.84 |
|  | 100.00 | 100.00 | 100.00 |

At 10% iron and 20% iron, a good strong joint was obtained and the braze flowed easily to produce a sound joint. At 30% iron (outside the invention) the braze alloy just started to melt and did not complete the joint.

An attempt to pulverize the foregoing cast alloys No. (3) and No. (4) within the invention showed that the alloy tended to be ductile and flattened out. The cast alloy without iron fractured. Thus, the presence of iron indicated an improvement in ductility.

Compacted brazing element rings were produced from blended minus 40 mesh alloy composition (Cu-Mn-Ni-Si-B) containing by weight 5, 10 and 20% electrolyte iron (minus 100 mesh), respectively, to provide the following average powder blend compositions:

|      | (6)   | (7)   | (8)   |
| ---- | ----- | ----- | ----- |
| % Cu | 38.1  | 36.4  | 33.3  |
| % Mn | 15.2  | 14.6  | 13.3  |
| % Ni | 39.1  | 37.2  | 34.2  |
| % Fe | 4.8   | 9.1   | 16.7  |
| % Si | 1.7   | 1.6   | 1.5   |
| % B  | 1.1   | 1.1   | 1.0   |
|      | 100.0 | 100.0 | 100.0 |

The rings corresponded to ring 12 shown in FIG. 1. The blended powder showed good compressibility and exhibited optimum green strength.

In preparing the annular preform of the brazing material described hereinabove, the brazing powder is mixed with ½% by weight of stearic acid as lubricant and a small but effective amount of a flux (about 5% by weight) as conventionally employed in the art is also added and the mixture pressed into the shape of a ring (note ring 12 of FIG. 1).

A plurality of tests was conducted using a compressed powder metal steel part as at least one of the parts to be brazed (note FIGS. 1 to 3). The steps employed in producing the steel part comprised mixing 1% by weight of finely divided graphite and ¾% by weight of zinc stearate with minus 100 mesh iron powder (either reduced oxide powder or atomized iron powder) and then pressing the mixture in a die to produce a cylinder of ⅝ inch in diameter and one inch high having a density of about 6.6. The part in this instance is presintered at 1000° F to remove the zinc stearate lubricant and the part then superposed on a substrate of pressed steel powder similarly prepared. The superposed parts as shown in FIG. 1 are assembled with the braze material as shown. The braze material has a small but effective amount of a conventional borate flux mixed with it, e.g. up to 5% by weight.

The parts assembled with the brazing material in place were then subjected to combined sintering and brazing for ½ hour at 2050° F (1120° C) in an atmosphere of wet Endogas.

The joints produced with the three levels of iron within the invention were sound, the braze material flowing smoothly to form the brazed joints with minimum dissolution of iron at the joint interface.

By employing the advantages of the invention, an improved brazed joint is obtainable comprising one metal part joined to another with the fused brazing alloy interposed therebetween, the brazed joint having a composition by weight of about 30 to 50% copper, about 10 to 20% manganese, about 3 to 25% iron (preferably about 5 to 20% or 5 to 15%), about 0.5 to 2% boron, about 0.5 to 4% silicon and the balance essentially nickel (e.g. about 30 to 50%). Preferably, the sum of the boron and silicon contents in the brazed alloy joint may range from about 1.7 to 4%. A more preferred composition is one in which the braze in the joint consists essentially of about 35% to 45% copper, about 10 to 20% manganese, about 5 to 20% iron, about 0.5 to 1.5% boron, about 0.5 to 3% silicon ranging from about 1.7 to 4%.

The braze composition of the invention may be employed in the brazing P/M steel parts having a broad range of green densities ranging from about over 5.5 and up to about 7 grams/cm$^3$.

As stated hereinbefore, the brazing temperature may be the same as the sintering temperature for steelforming powders. While a brazing temperature of about (1120° C) 2050° F has given good results, the temperature for both sintering and brazing may range from about 1850° F to 2150° F (1010° C to 1175° C) for 10 minutes to 1 hour and, more preferably, from 1950° to 2100° F (1065° to 1150° C).

The braze alloy composition is selected within the range given hereinbefore so as to melt, depending upon the iron content, over the range of about 1850° F (1010° C) to 2150° F (1175° C).

As stated above, the brazing alloy is particularly useful on ferrous metals, such as ferrous metals with and without carbon. Examples of ferrous metals containing carbon are steels with carbon ranging from 0.3 to 0.8 carbon and also alloy steels. The brazing alloy is especially useful on green and sintered powder metallurgy steel parts.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A brazing alloy composition consisting essentially by weight of about 30 to 50% copper, about 10 to 20% manganese, about 3 to 25% iron, about 0.5 to 4% silicon, about 0.5 to 2% boron and the balance essentially nickel ranging from about 30 to 50%, said alloy when employed to produce a brazed joint being characterized by improved ductility.

2. The brazing alloy composition of claim 1, wherein said alloy contains about 5 to 20% iron, about 0.5 to 3% silicon, and about 0.5 to 1.5% boron, the sum of the silicon and boron contents ranging from about 1.7 to 4%.

3. The brazing alloy composition of claim 2, wherein the copper content is about 35 to 45% and the balance essentially about 30 to 50% nickel.

4. A brazed metal joint comprised of metal parts with a fused brazing alloy interposed therebetween joining said parts together into a strong joint, said fused brazing alloy consisting essentially by weight of about 30 to 50% copper, about 10 to 20% manganese, about 3 to 25% iron, about 0.5 to 2% boron, about 0.5 to 4% silicon and the balance essentially nickel ranging from about 30 to 50%, the fused braze alloy at the joint being characterized by improved ductility.

5. The brazed joint of claim 4, wherein the braze alloy contains about 5 to 20% iron, about 0.5 % to 3% silicon, and about 0.5 to 1.5% boron, the sum of the silicon and boron contents ranging from about 1.7 to 4%.

6. A brazed metal joint comprised of metal parts, at least one of which is a porous powder metallurgy ferrous metal part, and a fused brazing alloy interposed between said parts joining said parts together into a strong joint with limited penetration of the brazing alloy into the porous ferrous metal part, said fused brazing alloy consisting essentially by weight of about 30 to 50% copper, about 10 to 20% manganese, about 3 to 25% iron, about 0.5 to 1.5% boron, about 0.5 to 3% silicon and the balance essentially nickel ranging from about 30 to 50%, the sum of the boron and silicon contents in the brazed alloy joint ranging from about 1.7 to 4%, the fused braze alloy at the joint being characterized by improved ductility.

7. The brazed joint of claim 4, wherein the brazed joint is formed of two ferrous metal parts.

8. The brazed joint of claim 4, wherein the metal parts are porous powder metallurgy parts of steel.

9. The brazed joint of claim 4, wherein the fused brazing alloy consists essentially by weight of about 35 to 45% copper, about 10 to 20% manganese, about 5 to 15% iron, about 0.5 to 1.5% boron, about 1 to 3% silicon and the balance essentially nickel.

10. A powder brazing alloy composition mixture consisting essentially of an alloy powder of Cu-Mn-Ni-Si-B mixed with an iron powder such that the average composition of the alloy powder-iron powder mixture consists essentially of about 30 to 50% copper, about 10 to 20% manganese, about 3 to 25% iron, about 0.5 to 4% silicon, about 0.5 to 2% boron, and the balance essentially nickel ranging from about 30 % to 50%, said powder when compressed into a green blank being characterized by improved green strength as compared to the alloy powder without iron powder present.

11. The powder brazing composition mixture of claim 10, wherein the average composition is such that the amount of iron ranges from about 5 to 20%, silicon from about 0.5 to 3%, boron from about 0.5 to 1.5%, the sum of the silicon and boron contents ranging from about 1.7 to 4%.

12. A powder brazing alloy composition mixture consisting essentially of an alloy powder of Cu-Mn-Ni-Si-B mixed with an iron powder selected from the group consisting of electrolytic and carbonyl iron powder, such that the average composition of the alloy powder-iron powder mixture consists essentially by weight of about 30 to 50% copper, about 10 to 20% manganese, about 3 to 25% iron, about 0.5 to 4% silicon, about 0.5 to 2% boron, and the balance essentially nickel ranging from about 30 to 50%, said powder when compressed into a green blank being characterized by improved green strength as compared to the alloy powder without iron powder present.

13. The powder brazing composition mixture of claim 12, wherein the average composition is such that the amount of iron ranges from about 5 to 20%, silicon from about 0.5 to 3%, boron from about 0.5 to 1.5%, the sum of the silicon and boron contents ranging from about 1.7 to 4%.

* * * * *